J. H. Currell,
Sawing Machine.
No. 108,886.          Patented Nov. 1, 1870.
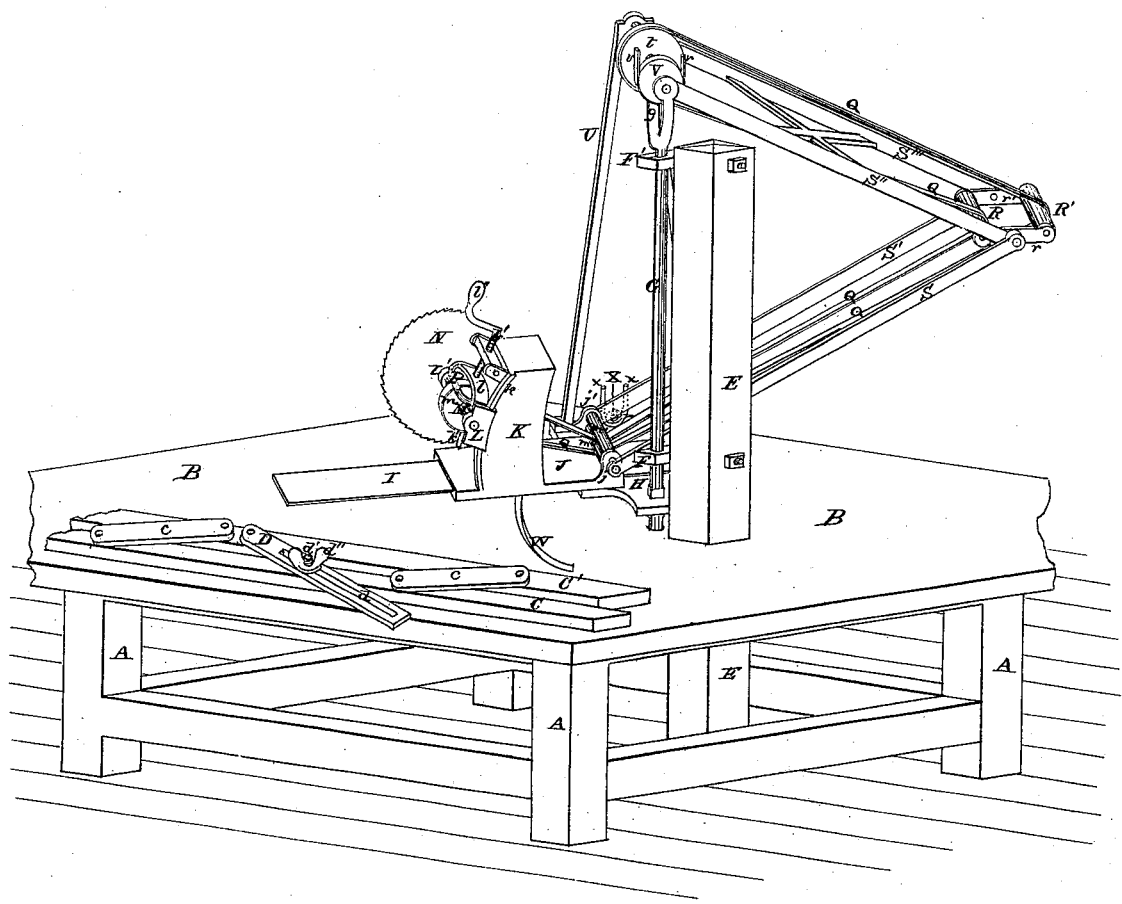
Attest
Jas. L. Ewin
Wm. H. Brereton
Inventor
James H. Currell
By Knight Bros.
his Attorneys

United States Patent Office.

JAMES H. CURELL, OF ST. LOUIS, MISSOURI, ASSIGNOR TO HIMSELF AND JEREMIAH E. MORRISEY, OF SAME PLACE.

Letters Patent No. 108,886, dated November 1, 1870.

IMPROVEMENT IN SAWING-MACHINES.

The Schedule referred to in these Letters Patent and making part of the same.

I, JAMES H. CURELL, of St. Louis, in the county of St. Louis and State of Missouri, have invented a certain Adjustable Sawing-Machine, of which the following is a specification.

Nature and Object of the Invention.

My invention consists of a circular saw whose mandrel is journaled to a vertically-adjustable frame on a horizontally-sliding carriage supported on a platform attached to a turn-post, so that the saw can be adjusted to any angle.

The saw is driven by a belt that is so arranged that neither the vertical adjustment of the saw nor the horizontal movement of the carriage will loosen or tighten the belt.

The drawing is a perspective view of my machine.

General Description.

A is the supporting-frame, and
B, the table upon which the stuff is laid.
C is the fixed bar of a parallel fence or gauge, and
C' is the adjustable bar of the same.
c are links connecting the bars C C' and serving to secure their parallelism in all positions of the bar C'.
D is a link, which is pivoted to the bar C' and slides upon the bar C.
This link has a slot, d, which receives a set-screw, d', extending upward from the bar C, and fitted with a thumb-nut, d'', which is turned down upon the link to hold the bar C' at the proper distance from that C.
E is a post, which is firmly fixed to the frame.
F F' are brackets attached to the post E, giving bearing to the turn-post G, which is stepped in the table B.
H is a horizontal platform attached to the turn-post G.
I is a slide-plate attached to the top of the platform, and having beveled edges, which are embraced by the edges of the base-plate J of the saw-carriage, which slides freely upon the plate I.
K is a standard-frame having curved out-turned edges, k, which are embraced by the edges of the journal-blocks L L' of the saw-mandrel M.
The journal-blocks L L' are connected by a cross-bar, l, in which turns the end of a screw, l', by the turning of which the saw N is adjusted vertically.
The screw l' is turned by a hand-crank, l'', and turns in a screw-threaded hole at the mid-length of the bar O, which is pivoted at the ends to allow of its turning as the screw is raised or lowered.
P is a handle, by which the carriage may be moved along the slide-plate I.
Upon the mandrel M is a pulley, m, turned by a belt, Q, that passes from the pulley m, beneath rollers m' m'', journaled in standards j j' at the rear end of the base-plate of the carriage.

From the rollers m' m'' the belt passes around two rollers or pulleys R R', which are journaled in bars r r' pivoted at the free ends of the rods S S' S'' S''', the other ends of the rods S S' being pivoted to the standards j j', and of the rods or frame S'' S''' to the shaft T.

From the pulleys R R' the belt passes around a pulley, t, upon the shaft T.

This shaft, at one end, is journaled upon a pedestal upon the platform H, its other end being journaled in the forked end g of the turn-post G; and the latter end of the shaft carries a pulley, V, whose belt v extends around a pulley over head, from which the machine receives its motion.

The rollers or pulleys R R' are journaled in pivoted bars, as shown, to allow the rollers to change their relative positions as they are lowered or raised by the movement of the carriage, so that their axes will always be in a plane which, being extended, would pass nearly midway between the rollers m' m'' and the shaft T, thus enabling the perfect operation of the device, namely, the non-stretching of the belt in the backward movement of the carriage.

W is a curved slot passing through the table, and equidistant, from end to end, from the turn-post G.

This slot is traversed by a bolt, X, which passes upward through the platform, and has a hand-nut, x, above the platform, and a thick washer or loose collar between the platform and the table, so that the platform may be rigidly held in the required position by tightening of the hand-nut.

The slides k have the form of arcs of circles whose centers are between the axes of the rollers m' m'', so that the raising or lowering of the saw will not affect the tightness of the belt Q. Neither is the tightness of the belt affected by the sliding of the carriage J, as the rods S S' are pivoted to a point of the standards j j', between the axes of the rollers m' m'', and the rods or frame S'' S''' pivoted on the shaft T, so that the rollers R R' are always the same distance from the pulley t and rollers m' m''.

The machine is intended more especially for use in the manufacture of front and back "strings" of stairs, in cutting out the "dadoes" or gains which receive the ends of the steps and "risers," but the application of the machine is very wide, for cutting miters, &c.

A portion of the table may be made vertically adjustable for stuff of different thickness.

The operation is as follows:

The stuff is placed upon the table with one edge against the fence or gauge C', and the saw being adjusted to the proper angle is drawn forward and cuts a horizontal kerf of any required depth.

In cutting dadoes (as in stair-strings or curved top pieces of window-frames or sash) two outside cutting-saws, and one or more clearing-saws, between them, are placed on the mandrel, so as to cut out the whole gain or dado at one passage of the saws.

Claims.

I claim as my invention—

1. The horizontally-sliding saw-carriage, supported on a turn-post, G, substantially as and for the purpose described.

2. In combination with the carriage J, the standards $j\ j'$ and $k\ k$, and journal-blocks L L', allowing the vertical adjustment of the saw without affecting the length of the belt, as described.

3. The combination of the rollers $m'\ m''$, R R', pulley $t$, rods S S' S'' S''', and belt Q, so connected and arranged as to permit the movement of the saw-carriage J without affecting the tightness of the belt, substantially as shown and described.

4. The combination of the turn-post G $g$, platform H, shaft T, and pulley V, substantially as described, and for the purpose set forth.

5. The combination of the turn-post G, platform H, set-screw X $x$, table B, and slot W, as and for the purpose described.

In testimony of which invention I hereunto set my hand.

JAMES H. CURELL.

Witnesses:
SAML. KNIGHT,
STEPH. BERNARD.